United States Patent [19]

King et al.

[11] 3,929,975

[45] Dec. 30, 1975

[54] SELECTIVE RECYCLE PRODUCTION OF ALUMINUM CHLORIDE

[75] Inventors: Larry K. King, Maryville, Tenn.; Noel Jarrett, Lower Burrell, Pa.

[73] Assignee: Aluminum Company of America, Pittsburgh, Pa.

[22] Filed: Dec. 26, 1973

[21] Appl. No.: 427,534

Related U.S. Application Data

[63] Continuation of Ser. No. 180,278, Sept. 14, 1971, abandoned.

[52] U.S. Cl. ............... 423/496; 423/136; 423/137; 423/463; 423/472
[51] Int. Cl.[2] ....................... C01F 7/58; C01F 7/60
[58] Field of Search .......... 423/496, 495, 136, 137, 423/463, 472

[56] References Cited
UNITED STATES PATENTS

| | | | |
|---|---|---|---|
| 359,601 | 3/1887 | Frishmuth | 423/496 |
| 1,699,229 | 1/1929 | Downs | 423/496 |
| 2,446,221 | 8/1948 | Ferguson | 423/496 |
| 3,786,135 | 1/1974 | King et al. | 423/496 |
| 3,811,916 | 5/1974 | Russell et al. | 423/137 |
| 3,842,163 | 10/1974 | Russell et al. | 423/496 |

FOREIGN PATENTS OR APPLICATIONS

| | | | |
|---|---|---|---|
| 668,620 | 3/1952 | United Kingdom | 423/496 |

OTHER PUBLICATIONS

Article by Oliver C. Ralston, "Anhydrous Aluminum Chloride," Technical Paper 321 (Dept. of Interior), 1923, pp. 14, 15 and 19.

*Primary Examiner*—Edward Stern
*Attorney, Agent, or Firm*—Robert E. Isner

[57] ABSTRACT

In the chlorination of sodium-contaminated alumina in the presence of a reducing agent in a bed to produce a hot gaseous effluent containing aluminum chloride, entrained particles, and condensable volatile constituents, the cooling of such hot gaseous effluent to selectively condense a portion of the condensable constituents therein, separating such entrained particles and condensed constituents from the cooled gaseous effluent and returning the same to the bed, the returned material constituting about 10–30% by weight of the alumina in the bed for acceleration of the chlorination reaction.

7 Claims, 1 Drawing Figure

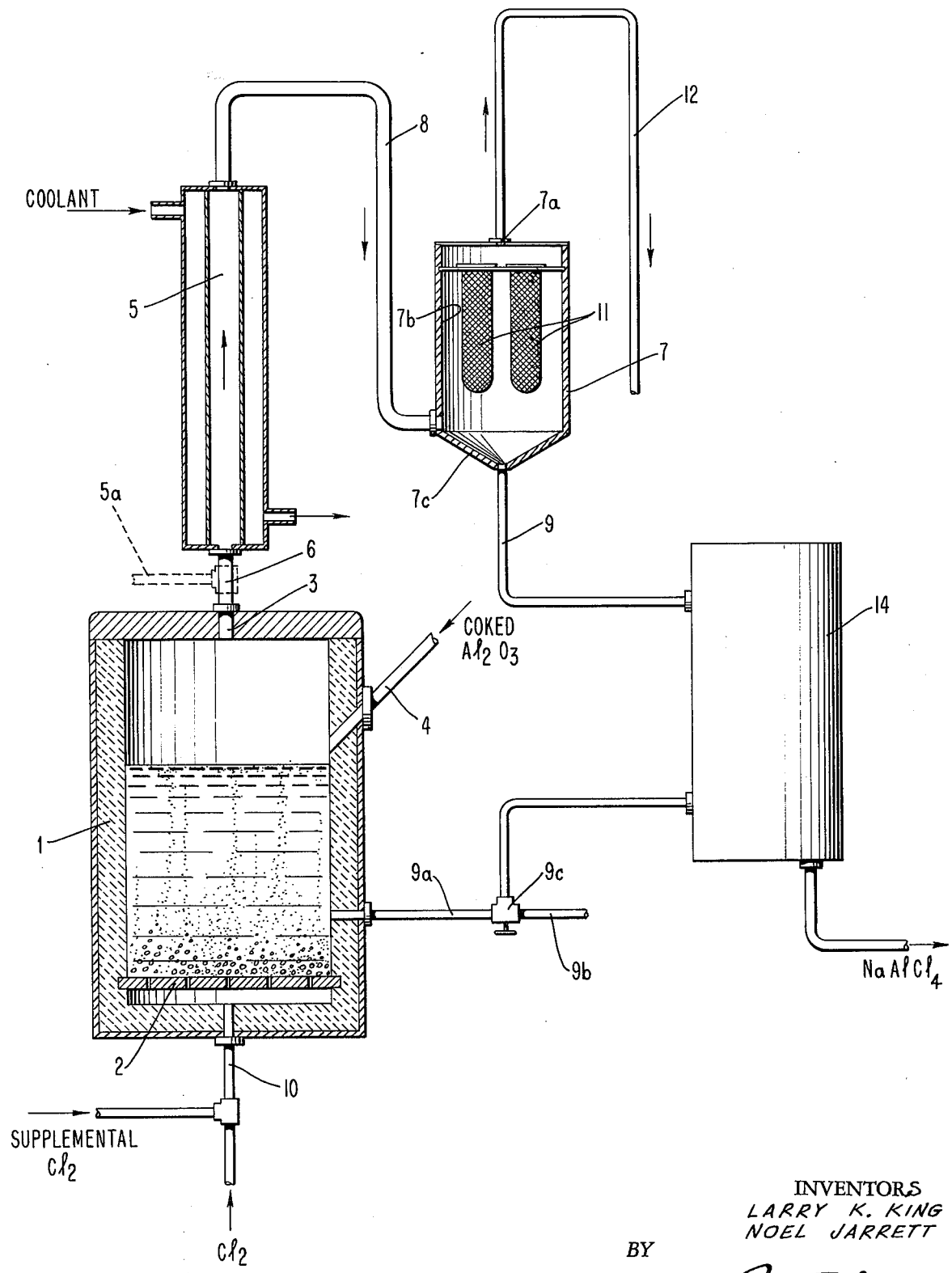

SELECTIVE RECYCLE PRODUCTION OF ALUMINUM CHLORIDE

This application is a continuation of our application Ser. No. 180,278 filed Sept. 14, 1971 now abandoned.

This invention relates to the production of aluminum chloride and particularly to a method therefor that includes the selective condensation and return of constituents of the gaseous effluent from the chlorination of sodium contaminated alumina in the presence of a reducing agent.

Although the potential advantages of utilizing aluminum chloride as a source material in the electrolytis production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental exploration and evaluation of numerous suggested expedients for obtaining such long desired result. However, to date none of these suggested expedients has succeeded in satisfying the desired objective of commercial quantity production of economically producible high purity aluminum chloride.

In general, the reduction of alumina or alumina-containing materials with chlorine in the presence of a reducing agent, such as carbon in some form, to produce aluminum chloride is an old and generally well-known reaction and one of the suggested expedients referred to above utilized bauxite as the alumina containing material. Bauxite, however, normally contains many chlorine reactable impurities including iron oxide, silica and titania and requires the reaction effluent to be subjected to cumbersome and expensive after-purification measures if even a reasonably pure aluminum chloride product is to be provided.

Likewise, reactions for producing aluminum chloride from alumina and alumina containing materials, in which the reducing carbon is present as phosgene, carbon tetrachloride and/or carbon monoxide, have also been employed by the art but commercial utilization of such processes has been impeded, if not precluded, by the inordinate expense of these starting materials and their hazardous nature.

This invention may be briefly described as a method for effecting the efficient and economic production of aluminum chloride by the chlorination of selectively constituted and sodium contaminated alumina in the presence of a carbonaceous reducing agent and which includes, in its broader aspects, the selective condensation of particular constituents of the hot gaseous effluent therefrom containing aluminum chloride, carbon oxides, entrained particles and condensable volatile constituents such as sodium aluminum chloride and separation and return of such constituents to the reaction vessel. In its narrower aspects the subject invention includes cooling the hot gaseous effluent to a predetermined low temperature to selectively condense at least a portion of the sodium aluminum chloride values therein, separating such condensed values and entrained particles, desirably as a flowable mass, from the gaseous effluent and returning at least a portion thereof to the chlorination zone.

It is an object of the present invention to provide an improved process for the effective and economical chlorination of sodium-contaminated porous alumina at comparatively low chlorination temperatures, with selective temperature control of the hot gaseous effluent for subsequent selective removal therefrom of entrained solid and liquid particles, and condensable volatile constituents including sodium-containing reaction products, followed by return of such removed material to the chlorination reaction zone to accelerate the chlorination reaction.

It is another object of the invention to provide for the selective removal from such hot gaseous effluent recovered from the chlorination reaction zone of a significant amount of solids and liquids as well as condensable volatile constituents present therein including sodium aluminum chloride, e.g. in the form of a complex with aluminum chloride, and for recycling such material in the form of a collected mass back to the reaction zone for revolatilization therein and for significant depression of the chlorination reaction temperature and/or improved reactivity, coupled with increased aluminum chloride yield.

It is still another object of the invention to remove and recycle such material in the form of a mass in a more or less constant amount, as collected, such amount representing about 10–30% by weight of the alumina introduced into the chlorination reaction zone.

Other and further objects of the present invention will become apparent from the within specification and accompanying drawings, in which:

The FIGURE is a schematic view of the essentials of an illustrative apparatus arrangement for carrying out the exothermic chlorination of coked or carbon impregnated porous alumina, with subsequent cooling, filtering and recycling of a portion of the filtered ingredients in accord with the principles of this invention.

It has been found that a versatile process for the effective and economical low temperature production of aluminum chloride comprises exothermically reacting chlorine at an elevated temperature, e.g., a temperature of between about 450–800°C, with a bed of selectively constituted and sodium contaminated particles of high surface area alumina, e.g., having a sodium impurities content of at most about 1.0% by weight calculated as $Na_2O$, in the presence of a reducing agent, such as carbon, to form a hot gaseous effluent containing aluminum chloride, entrained particles, and condensable volatile constituents. In accord with the practice of this invention, the hot gaseous effluent is cooled to a predetermined low temperature which is below the chlorination reaction temperature and above the condensation temperature of aluminum chloride under the ambient conditions, e.g., between about 200–500°C, effective to selectively condense a portion of the condensable constituents therein; such entrained particles and thereby condensed constituents including such condensed portion of the sodium aluminum chloride, e.g., in the form of a complex or mixture with attendant aluminum chloride, are then separated from the cooled gaseous effluent and returned in the form of a mass, e.g. as collected, to the chlorination zone, the returned mass constituting about 10–30% by weight of the alumina fed to the bed, for revolatilization of such condensed constituents in the chlorination zone and for acceleration of the chlorination reaction; and the aluminum chloride is recovered from the remaining gaseous effluent.

Desirably, means are provided to effect the removal of predetermined portions of the sodium aluminum chloride values from the separated constituents prior to their reintroduction into the chlorination reaction zone.

Generally, the further constituents or impurities in the hot gaseous effluent recovered from the chlorination zone may include entrained liquid and/or solid particles such as aluminum oxychloride and/or aluminum hydroxychloride as well as alumina and carbon. For convenience, aluminum oxychloride will be herein considered to broadly include the presence of aluminum hydroxychloride as well. Accordingly, portions of such aluminum oxychloride, aluminum hydroxychloride, alumina and carbon values are also separated upon such cooling and returned in such mass to the chlorination zone, such returned mass thus normally containing a complex or mixture of such sodium aluminum chloride with aluminum chloride, plus aluminum oxychloride, aluminum hydroxychloride, alumina and carbon.

In accordance with the principles of this invention selectively constituted alumina is subjected to the basic chlorination reaction. Such alumina may comprise substantially pure, i.e. containing less than 0.5% of iron, silicon and titanium impurities, Bayer process alumina having an average particle size of about 100-200 mesh, and having a sodium impurities content as contemplated herein of at most about 1.0%, e.g., about 0.1–1.0% and especially about 0.2–0.5%, by weight calculated as $Na_2O$, e.g., in the form of sodium carbonate, sodium aluminate and/or sodium silicate, and the like, the alumina being impregnated with carbon and having an average alpha alumina content of less than about 5% by weight; an average surface area of at least about 10 $m^2/g$, and preferably at least about 80 $m^2/g$; a loss on ignition content of at most about 5% and especially at most about 3% by weight; a carbon content of about 15–24% by weight, and a hydrogen content of less than about 0.5% by weight based on the total alumina, carbon and hydrogen contents present; such coked or carbon impregnated alumina is a highly reactive consumable material well-suited for the production of aluminum chloride according to the invention since it is essentially free from troublesome contaminants including water, hydrogen, oxygen, and iron, silicon and titanium impurities and since the carbon content is uniformly and thoroughly distributed in a sufficient layer throughout the internal and external surfaces of the alumina particles for a more uniform and complete chlorination reaction.

Surface areas referred to herein are measured by the Brunauer, Emmett and Teller method described in Journal of American Chemical Soc., Vol. 60, pp. 309–319.

The reaction is advantageously carried out in the substantial absence of hydrocarbons, free hydrogen-containing gas, free oxygen-containing gas and moisture, for example, using a fluidized bed technique or some other system or arrangement such as a kiln, e.g., rotary kiln, moving bed, static bed, etc. Also, the reaction can be carried out effectively at a pressure of between about 0.1–10 atmospheres absolute.

In conjunction with the above, the loss on ignition (L.O.I.) referred to is that weight loss resulting from the standardized heating of the alumina to 300°C to drive off surface adsorbed water followed by the further ignition heating or calcining heating of such alumina to 1,100°C, with weighing of the alumina after the 300°C heating and again after the 1,100°C heating to determine the percent L.O.I. In connection with the loss on ignition determination of alumina particles which have a volatile impurities content, e.g., sodium impurities, and which are impregnated with carbon, allowance must be made for the fact that such carbon and volatile impurities volatilize during the heating. Therefore, to make this determination on coked alumina, the carbon content and soda ($Na_2O$) content of the sample are measured on separate duplicate samples before and after ignition. The change in weight on ignition from loss of carbon and sodium impurities present is computed and subtracted from the total change in weight; the resultant difference divided by the original alumina content of the sample is the loss on ignition.

Furthermore, the alpha alumina content referred to herein is determined by X-ray diffraction examination of the particles, and ascertaining the ratio of peak intensity for the 116 plane to the intensity of the peak for that same plane obtained from a standard alpha alumina specimen.

The above described sodium contaminated, but otherwise preferably substantially pure, carbon impregnated porous alumina, having a sodium impurities content of at most about 1.0% by weight calculated as $Na_2O$, is reacted according to the present invention with, preferably dry, chlorine gas, at a temperature of between about 450°–800°C, preferably at about 500–750°C and more preferably at about 600°C, to form a hot gaseous effluent containing, along with aluminum chloride and carbon oxides, entrained particles and condensable volatile constituents including an amount of volatilized sodium aluminum chloride corresponding substantially to the sodium impurities content in the sodium contaminated particles of porous alumina used.

Such chlorination reaction is expediently carried out, in accordance with a preferred embodiment, by upwardly passing the dry chlorine gas through a chlorination fluidized bed of such coked, carbon coated or carbon impregnated porous alumina particles in an amount sufficient to fluidize the chlorination bed and to react with coked or carbon impregnated alumina therein, preferably substantially exothermically, e.g., at a temperature of between about 500°–700°C, and preferably in the substantial absence of hydrocarbons, free hydrogen-containing gas, free oxygen-containing gas and moisture.

The above described hot gaseous effluent from the chlorination reaction is cooled to a predetermined temperature that is below the chlorination reaction temperature and above the condensation temperature of aluminum chloride under the ambient conditions but yet sufficient to condense a selective portion of the condensable constituents therein including a corresponding portion of the volatilized sodium aluminum chloride present. The entrained particles or constituents and the now condensed constituents including such condensed portion of the sodium aluminum chloride present in the resulting cooled gaseous effluent are then separated and returned in the form of a mass to the chlorination bed; whereupon the aluminum chloride values can thereafter be recovered from the residual cooled gaseous effluent.

In order to exercise control over the character of the separated constituents returned to the chlorination reaction zone, a portion of the sodium aluminum chloride values therein are rendered subject to removal, as by heating or washing and filtering, intermediate the initial separation thereof from the hot gaseous effluent and the ultimate return thereof to the chlorination. Under the chlorination and cooling conditions of the invention, the returned or recycled mass selectively constitutes about 10–30% by weight and preferably about 15–25% by weight of the average content of alumina in the chlorination bed.

In more particularity, the hot gaseous effluent may be selectively cooled to such predetermined temperature which will fall between about 200°–500°C, and preferably be about 250°–350°C.

As a result of such cooling, the portion of the attendant volatilized sodium aluminum chloride formed from the sodium impurities in the coked alumina which is condensed at this point is generally condensed in combination with a minor attendant quantity of aluminum chloride, and this sodium aluminum chloridealuminum chloride complex, as well as concomitant impurities contents of associated carbon, alumina, aluminum oxychloride and aluminum hydroxychloride values also present, from the returnable mixture or mass of solids and liquids particles.

Advantageously, those traces of at most about 1.0% by weight (as $Na_2O$) sodium impurities present as sodium contaminants in the coked alumina, e.g., stemming from the use of caustic solution to prepare the alumina by the Bayer process, and attendant hydrogen and/or moisture, which are reacted with chlorine and alumina during the overall chlorination reaction as noted above, form corresponding amounts of sodium aluminum chloride ($NaAlCl_4$) as well as some aluminum oxychloride ($AlOCl$) and aluminum hydroxychloride ($Al[OH]_2Cl$), dissolved therein, which apparently perform a significant function. These values which are in turn separated in selective part in the form of a mass with the entrained particles, surprisingly improve the reactivity of the system when retained in the system, i.e., by returning the mass of separated materials to the chlorination bed. The returned mass, controlled in character and amount as described above, apparently improves the reactivity and fluidization in the fluidized bed embodiment for some unknown reason, perhaps by preventing accumulation of alpha alumina in the bed with consequent bed degradation or by a catalytic effect of aluminum chloride or sodium aluminum chloride or by an inherent adjustment of the particle size distribution in the reaction vessel. In any case, such returned mass, which selectively constitutes about 10–30% and preferably about 15–25%, e.g., about 17%, by weight of the alumina fed to the bed, and which includes about 10–15%, e.g., 12%, by weight of sodium aluminum chloride-aluminum chloride complex mixture, specifically serves to catalyze the reaction of alumina, carbon and chlorine or at least to depress the reaction temperature whereby to produce aluminum chloride, carbon dioxide and carbon monoxide at lower temperatures than would otherwise be the case, and in concomitantly higher yields.

For example, without this recycled mass being present in the system, the exothermic chlorination reaction might require a temperature of 700°C whereas with its presence, in accordance with the instant recycle technique, a temperature of only 600°C is needed for comparable results.

It is believed that the volatilized sodium aluminum chloride predominantly condenses as a result of the selective cooling of the hot gaseous effluent recovered from the chlorination reactor in such a way that under the ambient conditions the condensed sodium aluminum chloride, more or less in the form of a complex with attendant aluminum chloride, as well as the liquid particles of aluminum oxychloride and/or aluminum hydroxychloride, readily deposit on the entrained solids for collection even before reaching the operative physical separation area of the contaminant particles removal arrangement provided.

While prior art procedures have involved the positive step of supplying extraneous sodium, e.g., in the form of sodium chloride, to the chlorination system in which bauxite, carbon, e.g., in the form of phosgene and/or carbon monoxide, and chlorine are reacted, it is distinctly surprising that the use of carbon and relatively pure porous alumina for the chlorination, with recycling of a mass of ingredients of the instant type in such a large quantity based on the average alumina content of the chlorination bed therein, can achieve the improved reactivity in question. This could not have been predicted on the basis of the sodium impurities present in the starting sodium contaminated alumina. That content of sodium impurities in the recycled mass according to the invention represents a constant amount selectively removed as a function of the cooling step and the same is not independently added to the system nor recycled therein as sodium chloride or sodium aluminum chloride but instead as an indiginous built-up complex quantity in an overall mass inherently including other contaminants operatively removed and recycled therewith.

In accordance with the foregoing, it will be realized that the sodium aluminum chloride with condenses out and which is removed at the removal station generally condenses to liquid form as a complex mixture with an appropriate minor amount of the aluminum chloride present, and such complex mixture generally contains in association therewith or dissolved therein not only concomitantly removed aluminum oxychloride and aluminum hydroxychloride but also traces of chlorine, phosgene, and the like, as well as alumina which stems from entrained alumina dust originally present or which forms by reaction of aluminum chloride with moisture which may be present, thereby also forming hydrogen chloride. Aside from this alumina, entrained coked alumina solids and carbon dust may also be present. All of these types of ingredients can constitute the make-up of the mass continuously collected at the removal station for possible selective removal of sodium aluminum chloride values therefrom and reintroduction of the balance to the chlorination for recycling according to the invention.

CHLORINATOR AND RECYCLING APPARATUS

The FIGURE of the drawing schematically delineates an illustrative chlorinator and recycle apparatus for operation in accordance with the principles of this invention.

The illustrated structure includes a fluidized bed chlorination reactor vessel 1 having a fluidizing gas distribution inlet 2 for introduction of chlorinating gas at the lower end thereof, a gaseous effluent outlet 3 at the upper end thereof, and a lateral coked alumina inlet 4 disposed above the gas inlet 2 for introducing therein coked or carbon impregnated alumina particles to be chlorinated so as to produce a hot condensable gaseous chloride product under the chlorination conditions.

The gaseous effluent outlet 3 is connected through line 6 to a cooling assembly, suitably a heat exchanger 5 and in which the aluminum chloride-containing gaseous effluent from the chlorination reactor vessel 1 is cooled to a predetermined lower temperature that is insufficient to condense significant quantities of the gaseous aluminum chloride product under the ambient conditions. The output side of the heat exchanger 5 is connected via line 8 to a separator assembly 7 suitably comprising a solids filter to separate entrained solids and liquids as well as condensed volatile constituents which inherently condense upon such cooling, e.g., sodium aluminum chloride, from the cooled gaseous effluent. The separated material passes through a recycle conduit 9 into a second separator 14. The second separator facilitates the selective removal of predetermined quantities of sodium aluminum chloride from the primary separated mass. Such separation may be effected by selective revolatilization thereof by a heating operation, by filtering or by a selective washing operation. Such selective separation of the sodium aluminum chloride values provides an effective degree of control over the composition of the fluidized bed in the chlorinator and contributes to the maintaining of optimum operation thereof. The remaining separated materials are directed back into the chlorination reactor vessel 1, i.e., for effecting the controlled return of at least a portion of such removed solids and liquids as well as condensed volatile constituents directly back to the reactor vessel, e.g., in the form of a mass, by suitable means including the return inlet 9a.

Flow-assisting gas, e.g., chlorine, can be injected, optionally, via line 9b to implement the return of such mass through line 9a to reactor vessel 1, valve 9c being provided appropriately in recycle conduit 9 to control the flow of such gas for this purpose.

The chlorine gas used for the chlorination is fed to distribution inlet 2 via line 10 and can be supplied from any source such as a liquid chlorine storage supply, e.g., at ambient temperature (about 15°–30°C) and at 1 atmosphere gauge pressure.

Chlorination reactor vessel 1 will, of course, be constructed of material which will withstand the ambient elevated operating temperature and pressures (e.g, up to 10 atmospheres absolute), as well as the action of chlorine, and at the same time be capable of being sealed against air and moisture.

Likewise, the heat exchanger 5 may take any suitable form such as a conventional concentric shell and tube type unit supplied with a commercially available fluid coolant such as a liquid Dowtherm coolant (Dow Chemical Co. product). Alternatively, the cooling unit may be optionally provided with coolant feed means, shown in phantom in the form of a feed pipe 5a, to feed a cooling agent, such as dry inert gas or solid particles of aluminum chloride, into direct contact with the gaseous effluent therewithin to reduce the temperature thereof.

The separator unit 7 may also take any suitable form. The illustrated unit generally includes a vertical filter chamber enclosing a plurality of permeable filter members 11 and having a downstream outlet opening 7a at the upper end thereof for discharge therefrom of residual cooled gaseous effluent and insulated side walls 7b dependently terminating in a collection hopper 7c connected with the recycle conduit 9.

Side walls 7b preferably have a substantially smooth imperforate run-off surface and are suitably insulated to minimize condensation of volatile constituents present in the cooled gaseous effluent thereon. The filter members 11 each desirably have a relatively smooth outer surface, and are preferably composed of porous ceramic or stone filter material, e.g., magnesium aluminum silicate. Such filters are periodically back flushed or otherwise cleaned to effect removal of separated material therefrom that has not otherwise drained into collection hopper 7c for collection as a mass with the condensed volatile constituents and liquid particles flowing downwardly thereto.

In operation of the described system, filters 11 are advantageously kept at a sufficiently high temperature, e.g., about 200°–500°C, due to the continuous flow of hot gases therethrough, that remaining volatiles do not condense out on the media under the flow conditions intended but instead as aforesaid the portion of the volatiles potentially condensable at this stage will have already condensed out with or on the entrained solids.

The residual gaseous effluent leaving assembly 7 via line 12 may be treated to recover the aluminum chloride values therefrom.

EXAMPLE

The following example is set forth to illustrate, without limitation, various features of the present invention.

Substantially pure, yet sodium contaminated, porous alumina particles of about 100 mesh average particle size, produced from bauxite by the Bayer process, containing less than about 0.5% by weight total iron, silicon and titanium constituents and specifically about 0.25% by weight sodium constituents, calculated as $Na_2O$, and precalcined at about 850°C to provide a final calcined product having less than about 5% by weight alpha content and less than about 5% by weight L.O.I. and a surface area of about 100 $m^2$/g, and which had been impregnated with carbon and had an average carbon content of about 17% by weight and an average hydrogen content of less than about 0.5% by weight based on the alumina, carbon and hydrogen content present, were fed at a rate of 36 pounds per hour via lateral inlet 4 into the bed reactor vessel 1 of the closed system apparatus of the FIGURE of the drawing.

The foregoing sodium contaminated coked carbon coated or carbon impregnated porous alumina particles were fed to reactor vessel 1 for chlorination with dry chlorine gas upwardly passed through gas distribution inlet 2. The chlorine gas was fed at a rate of 60 pounds per hour which was sufficient to fluidize the thus fed coked alumina particles and react therewith. The reaction between the chlorine gas and the coked alumina particles was exothermic and a chlorination temperature of about 575°C was initially maintained.

The gaseous effluent at about 575°C passing through outlet 3 was fed to a heat exchanger 5 and was cooled therein to about 250°C. Such gaseous effluent contained vaporous or gaseous aluminum chloride as well as carbon dioxide and carbon monoxide, together with entrained dust including carbon and coked alumina as well as residual impurities present in the starting material.

The 250°C cooled gaseous effluent was filtered from entrained dust and liquids particles and thereby condensed volatiles in the filter assembly 7. Such entrained dust and liquids particles and condensed volatile constituents so-filtered out in separator 7 included sodium aluminum chloride-aluminum chloride mixture, in consequence of sodium impurities present in the Bayer process starting alumina, as well as aluminum oxychloride, aluminum hydroxychloride, alumina and carbon, and traces of chlorine, hydrogen chloride and phosgene, all of which were continuously recovered more or less in the form of a mixture. The condensed volatile constituents therein were those which condensed out as a result of the cooling of the gaseous effluent from the chlorination temperature to 250°C.

The resulting mixture of entrained dust and liquid particles and condensed volatile constituents as collected in hopper 7c was continuously returned to the bed via line 9a. This recovered and returned mass consisting essentially of sodium aluminum chloride, aluminum oxychloride and particles of carbon and alumina amounted to 15% by weight of the fresh carbon impregnated alumina feed. The amount of the mass returned was significantly large as compared with the amount of coked alumina present in the exothermic reaction bed in reactor vessel 1.

By comparison, when the separated mass was not returned to the bed — with otherwise generally comparable conditions — a temperature of 710°C in the bed was needed to achieve comparable efficiency of conversion of chlorine to aluminum chloride. This result was surprising since it would not have been expected that the continuous return of such a large constant amount of removed constituents including sodium impurities would have any such pronounced temperature influence on the carrying out of the exothermic reaction. Apparently, a concentration of sodium aluminum chloride and/or other constituents in the returned mass builds up inherently in the fluidized bed in reactor vessel 1 which enhances the chlorination reaction, perhaps by improving fluidization, e.g., by influencing the particle size distribution in the bed, and/or perhaps by improving the reactivity of the system by catalytic effect.

Aluminum chloride was recovered in substantially pure form from the residual gaseous effluent exiting from separator 7 via line 12. Such aluminum chloride was recovered in a substantially higher yield based on the alumina reacted than when such separated mixture was not returned to the bed.

What is claimed is:

1. In a process for the production of aluminum chloride by exothermically reacting substantially hydrogen-free sodium contaminated alumina having less than 0.5% of iron, silicon and titanium impurities therein and no more than 1.0% of sodium impurities therein calculated as $Na_2O$ and an average alpha alumina content of less than about 5% and an average surface area of at least about 10 $m^2$/g, with chlorine gas in the presence of a substantially hydrogen-free solid carbonaceous reducing agent to form a hot gaseous effluent containing aluminum chloride values, entrained particles including aluminum oxychloride values, and condensible volatile constituents including sodium aluminum chloride values, the steps of cooling the hot gaseous effluent to a predetermined low value intermediate the chlorination reaction temperature and the condensation temperature of aluminum chloride under the ambient conditions there extant to condense at least a portion of the sodium aluminum chloride values therein, separating a mixture of such condensed sodium aluminum chloride values, and entrained particles including aluminum oxychloride from said gaseous effluent and selectively returning predetermined portions of said mixture to the chlorination zone during the continuance of the chlorination reaction therein in a combined amount of about 10–30% by weight of the alumina introduced into said chlorination zone to maintain catalytic enhancement of the chlorination reaction to progressively effect the removal of contaminant oxygen values from said hot gaseous effluent.

2. Process according to claim 1 wherein said mixture is returned to the chlorination zone in a combined amount of about 15–25% by weight of the alumina introduced into said chlorination zone.

3. Process according to claim 1 wherein said entrained particles include particles of carbon and alumina.

4. Process according to claim 1 wherein the chlorination reaction is effected at a temperature of between about 450°–800°C in a fluidized bed and said effluent is cooled to a temperature of between about 200°–600°C.

5. In a process for the production of aluminum chloride by exothermically reacting chlorine gas at a temperature of between about 450°–800°C in a chlorination zone with substantially hydrogen-free sodium contaminated particles of carbon impregnated porous alumina having less than 0.5% of iron, silicon and titanium impurities therein and no more than 1.0% of sodium impurities therein calculated as $Na_2O$, and an average alpha alumina content of less than about 5% and an average surface area of at least about 10 $m^2$/g to form a hot gaseous effluent containing aluminum chloride, carbon oxides, entrained particles of carbon impregnated alumina and aluminum oxychloride values, and condensable volatile constituents including sodium aluminum chloride, the steps of cooling the hot gaseous effluent to a predermined low value intermediate the chlorination reaction temperature and the condensation temperature of aluminum chloride under the ambient conditions there extant to condense at least a portion of the sodium aluminum chloride values therein, separating such condensed values, and said entrained particles including said aluminum oxychloride values from said gaseous effluent, removing predetermined portions of said separated materials from accumulation thereof and selectively returning the balance thereof to the chlorination zone during the continuance of the chlorination reaction proceeding therein in a combined amount of about 10–30% by weight of the alumina introduced into said chlorination zone to maintain catalytic enhancement of the chlorination reaction and to progressively effect the removal of contaminant oxygen values from said hot gaseous effluent.

6. Process according to claim 5 including the step of cooling said hot gaseous effluent to a temperature of between about 200°–600°C.

7. Process according to claim 5 wherein said separated condensed values and entrained values returned to the chlorination zone comprise, in combined amounts, of about 15–25% by weight of alumina introduced into the chlorination zone.

* * * * *